May 30, 1944.  A. C. DITZEL  2,349,943
PROCESS FOR PURIFYING DISODIUM PHOSPHATE
Filed April 2, 1942
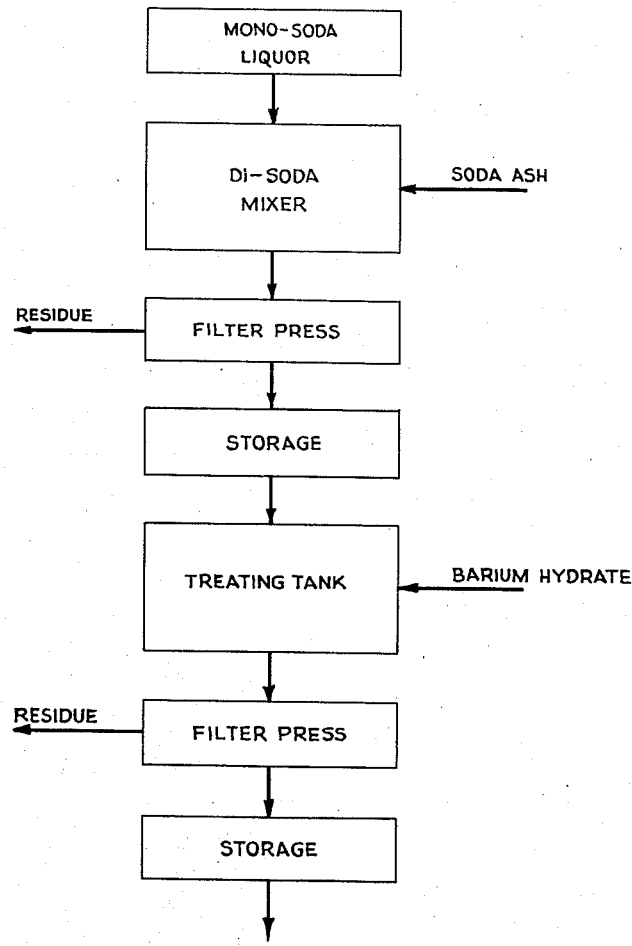
Arthur C. Ditzel  INVENTOR
BY George T. Johannesen  ATTORNEY Patented May 30, 1944

2,349,943

UNITED STATES PATENT OFFICE 2,349,943

PROCESS FOR PURIFYING DISODIUM PHOSPHATE

Arthur C. Ditzel, Elizabeth, N. J., assignor to E. I. du Pont de Nemours & Company, Wilmington, Del., a corporation of Delaware Application April 2, 1942, Serial No. 437,375

11 Claims. (Cl. 23—107)

This invention relates to the manufacture of disodium phosphate duohydrate crystals and is directed to processes in which disodium phosphate liquor containing impurities of phosphate rock is treated with a small amount of barium hydrate sufficient to precipitate barium diphosphate and then clarified.

Phosphoric acid as produced by the digestion of phosphate rock with sulfuric acid contains a number of impurities of the phosphate rock, among which may be mentioned sulfates, fluorine compounds, iron compounds and aluminum compounds. In the normal processing of such acid to disodium phosphate liquor these impurities persist in varying amounts and some of them interfere with the production of disodium phosphate duohydrate crystals. Available methods of producing disodium phosphate liquor separate out the bulk of the phosphate rock impurities but, nevertheless, traces of such impurities are sufficient to interfere with the production of duohydrate crystals appearing as incrustations on the steam pipes or other heating surfaces in concentrators or evaporators or as insoluble matter in the duohydrate crystals whereby the crystals have an objectionable tendency to produce cloudy solutions.

I have now found that these difficulties of the prior art processes may be avoided by treating disodium phosphate liquid contaminated with phosphate rock impurities that is to say, the impure disodium phosphate liquor obtained by neutralizing phosphoric acid produced from phosphate rock and sulfuric acid with sodium carbonate and separating the precipitated impurities by filtration, with a small amount of barium hydrate sufficient to precipitate barium diphosphate. It appears that the barium diphosphate which is thus precipitated in situ in the impure disodium liquor combines with the soluble impurities therein either mechanically, e. g., by occlusion, or chemically and carries them down in the precipitate. At any rate, when the disodium phosphate liquor thus treated is clarified in a suitable press it may be continuously evaporated in a saturator of suitable design without incrustation of the heating surfaces and without producing a product contaminated with insolubles.

The invention may be more fully understood by reference to the accompanying flow sheet which illustrates graphically a method suitable for practicing the invention. According to the process therein outlined monosodium phosphate liquor obtained from crude phosphoric acid produced by the digestion of phosphate rock with sulfuric acid as neutralized to disodium phosphate according to the process outlined in U. S. Patent 2,271,712 granted February 3, 1942. In brief, phosphoric acid in the state of purity obtaining after separation of the gangue (gypsum plus residue of phosphate rock extraction) is treated with recycled disodium phosphate liquor or other suitable base such as sodium carbonate in order to neutralize the acid sufficiently to cause sodium fluosilicate to separate out but with the liquor still acid enough to prevent separation of acid-soluble phosphates such as aluminum and iron phosphates. The sodium fluosilicate is removed and the liquor treated with barium carbonate to precipitate sulfate which may be removed then or left in the liquor and removed in a subsequent filtration. Sodium carbonate is then added to slightly beyond the monosoda stage and the liquor is again filtered to remove the precipitate which includes the sulfate, if this has not been previously removed, together with acid-soluble phosphates such as aluminum and iron. The filtrate, which has a gravity of about 30° Baumé (about 16% $P_2O_5$) is heated in the disoda mixer and soda ash is added rapidly until close to the endpoint. The liquor is then boiled and soda ash is slowly added until the endpoint is reached. The liquor is then boiled for at least 20 minutes and filtered to remove the precipitate which consists primarily of calcium phosphate ($CaHPO_4$) together with small amounts of iron and aluminum phosphates, silica and fluorine compounds. There is thus obtained a clear disodium phosphate liquor of approximately 30–32° Baumé (about 14% $P_2O_5$) at about 180° F.

The disodium phosphate liquor thus obtained is heated to boiling in the treating tank and barium hydrate, $Ba(OH)_2 \cdot 8H_2O$, is added in the amount of 0.12 lb. barium hydrate for each 100 lbs. of disodium phosphate, calculated as anhydrous, in the solution. For example, 12 lbs. of barium hydrate dissolved in 50 gallons of water is used to treat 36,000 lbs. of the disodium phosphate liquor. The barium hydrate solution is added over a period of about 15 minutes. The liquor is then clarified while still hot by means of a suitable filter press of the insoluble barium salts formed by the treatment. The filtrate is a clear liquor which may be stored without crystallization or other complications and is so clarified of impurities that it may be concentrated according to the customary practice for producing duohydrate crystals without deleterious formation of incrustations in the evaporators and produces a duohydrate crystal which may be dissolved to produce entirely clear solution.

I have thus provided a method whereby disodium phosphate solutions contaminated with phosphate rock impurities may be clarified of those impurities in a simple effective and economic manner. I do not wish, however, to be limited to the precise details of the method described, and it will be understood that variations may be made therein without departing from the spirit and scope of the invention. Thus the contaminated disodium phosphate liquor may be produced by a wide variety of methods from crude phosphoric acid produced in various ways and containing various of the phosphate rock impurities. The essential thing is that the disodium phosphate liquor containing the phosphate rock impurities be treated with barium hydrate, preferably after the disodium phosphate liquor has been treated, either according to the U. S. Patent 2,271,712 or otherwise, to remove as much of the phosphate rock impurities as possible and preferably after the contaminated disodium phosphate liquor has been filtered. It is essential to the process that barium hydrate be used and other barium compounds, quite apart from the fact that they would contaminate the liquor, do not have the same clarifying effect that barium hydrate does.

The disodium phosphate liquor containing the phosphate rock impurities after the usual processing will normally have a concentration of approximately 30–32° Baumé at 180° F. (about 14% $P_2O_5$). Within the scope of the invention, however, this concentration may vary say from about 10 to about 25% $P_2O_5$ (20–55° Baumé). The amount of phosphate rock impurities in these liquors normally is very small. Iron and aluminum phosphates, for example, are usually less than 0.05 per cent. The liquor is essentially saturated with these impurities because of their manner of separation. Being acid-soluble they precipitate as the liquor is made more basic. The barium hydrate may be added either before or after they are separated, but excessive quantities of the barium hydrate are required unless the disodium phosphate liquor is first freed of such precipitate.

The amount of barium hydrate required is very small. It should be added in amount sufficient to precipitate barium diphosphate and need not normally exceed 0.2 part by weight for every 100 parts of disodium phosphate, calculated as anhydrous, in the solution. Larger amounts may be employed but of course are not economical.

The treatment is most suitably carried out at the boiling point of the liquor. Lower temperatures may be employed but the reaction of the barium hydrate with the impurities is not as efficient and more hydrate is required if the liquor is cool.

I claim:

1. In a process for purifying disodium phosphate liquor contaminated with soluble phosphate rock impurities the steps of reacting the liquor with a small amount of barium hydrate but sufficient to form a precipitate of barium diphosphate which acts to remove said impurities from solution, and filtering the resultant material.

2. In a process for purifying disodium phosphate liquor contaminated with soluble phosphate rock impurities the steps of reacting the liquor while boiling with a small amount of barium hydrate but sufficient to form a precipitate of barium diphosphate which acts to remove said impurities from solution, and filtering the resultant material.

3. In a process for purifying disodium phosphate liquor contaminated with soluble phosphate rock impurities the steps of reacting the liquor while at a concentration of about 30–32° Baumé with a small amount of barium hydrate but sufficient to form a precipitate of barium diphosphate which acts to remove said impurities from solution, and filtering the resultant material.

4. In a process for purifying disodium phosphate liquor contaminated with soluble phosphate rock impurities the steps of reacting the liquor while at a concentration of about 30–32° Baumé and while boiling with a small amount of barium hydrate but sufficient to form a precipitate of barium diphosphate which acts to remove said impurities from solution, and filtering the resultant material.

5. In a process for purifying disodium phosphate liquor contaminated with soluble phosphate rock impurities the steps of reacting the liquor with an amount of barium hydrate not substantially in excess of 0.2 part by weight for every 100 parts by weight of disodium phosphate calculated as anhydrous but sufficient to cause the formation of a precipitate of barium diphosphate which acts to remove said impurities from solution, and filtering the resultant material.

6. In a process for purifying disodium phosphate liquor contaminated with soluble phosphate rock impurities the steps of reacting the liquor while boiling with an amount of barium hydrate not substantially in excess of 0.2 part by weight for every 100 parts by weight of disodium phosphate calculated as anhydrous but sufficient to cause the formation of a precipitate of barium diphosphate which acts to remove said impurities from solution, and filtering the resultant material.

7. In a process for purifying disodium phosphate liquor contaminated with soluble phosphate rock impurities the steps of reacting the liquor while at a concentration of about 30–42° Baumé with an amount of barium hydrate not substantially in excess of 0.2 part by weight for every 100 parts by weight of disodium phosphate calculated as anhydrous but sufficient to cause the formation of a precipitate of barium diphosphate which acts to remove said impurities from solution, and filtering the resultant material.

8. In a process for purifying disodium phosphate liquor contaminated with soluble phosphate rock impurities the steps of reacting the liquor while at a concentration of about 30–42° Baumé and while boiling with an amount of barium hydrate not substantially in excess of 0.2 part by weight for every 100 parts by weight of disodium phosphate calculated as anhydrous but sufficient to cause the formation of a precipitate of barium diphosphate which acts to remove said impurities from solution, and filtering the resultant material.

9. In the manufacture of disodium phosphate duo-hydrate from disodium phosphate liquor contaminated with soluble phosphate rock impurities the steps of separating precipitated phosphate rock impurities from disodium phosphate liquor, heating the liquor, reacting the hot liquor with a small amount of barium hydrate but sufficient to form a precipitate of barium diphosphate which acts to remove said impurities from solution, separating the precipitate from the liquor, and treating the liquor to cause formation of crystals of disodium phosphate duohydrate.

10. In the manufacture of disodium phosphate duohydrate from disodium phosphate liquor contaminated with soluble phosphate rock impurities the steps of preparing disodium phosphate liquor of a strength of about 30-32° Baumé from crude phosphoric acid obtained from phosphate rock and sulfuric acid, filtering said liquor to remove phosphate impurities thereby leaving a disodium phosphate liquor contaminated with soluble phosphate rock impurities, heating the filtered liquor and reacting it with a small amount of barium hydrate but sufficient to form a precipitate of barium diphosphate which acts to remove said impurities from solution, clarifying the liquor in a filter press and concentrating it to crystallizing strength.

11. In the manufacture of disodium phosphate duohydrate from disodium phosphate liquor contaminated with soluble phosphate rock impurities the steps of preparing monosodium phosphate liquor of about 30° Baumé concentration from crude phosphoric acid obtained from phosphate rock and sulfuric acid, treating with a barium compound to precipitate sulfate and filtering to remove precipitated barium sulfate and precipitated phosphate rock impurities, neutralizing the monosodium phosphate liquor to disodium phosphate liquor and again filtering to remove phosphate rock impurities thereby leaving a disodium phosphate liquor contaminated with soluble phosphate rock impurities, heating the disodium phosphate liquor to boiling and reacting it with an amount of barium hydrate not substantially in excess of 0.2 part by weight for every 100 parts by weight of disodium phosphate calculated as anhydrous but sufficient to cause the formation of a precipitate of barium diphosphate which acts to remove said impurities from solution, filtering the thus treated liquor and concentrating it to crystallizing strength and recovering disodium phosphate duohydrate crystals therefrom.

ARTHUR C. DITZEL.